United States Patent [19]

Engel et al.

[11] Patent Number: 4,610,898
[45] Date of Patent: Sep. 9, 1986

[54] PROCESS FOR BAKE COATING THE SURFACES OF SOLID SUBSTANCES

[75] Inventors: Dieter Engel, Kelsterbach; Josef Mondt, Königstein; Helmut Rinno, Hofheim am Taunus, all of Fed. Rep. of Germany

[73] Assignee: Hoechst Aktiengesellschaft, Frankfurt, Fed. Rep. of Germany

[21] Appl. No.: 714,043

[22] Filed: Mar. 19, 1985

[30] Foreign Application Priority Data

Mar. 21, 1984 [DE] Fed. Rep. of Germany ....... 3410235

[51] Int. Cl.$^4$ .............................................. B05D 3/02
[52] U.S. Cl. ................................. 427/379; 427/385.5; 427/386; 427/388.2; 427/388.3; 427/388.4
[58] Field of Search ................. 427/379, 385.5, 388.2, 427/388.3, 388.4, 386

[56] References Cited

U.S. PATENT DOCUMENTS 4,264,656 4/1981 Reeder ............................. 427/385.5
4,351,755 9/1982 Brixius et al. ................ 427/388.2 X
4,431,689 2/1984 Günter ............................. 427/388.2

Primary Examiner—Thurman K. Page
Attorney, Agent, or Firm—Berman, Aisenberg & Platt

[57] ABSTRACT

Process for bake coating the surfaces of solid materials by applying the required amount of an aqueous dispersion to the surface to be coated, the dispersion containing, as the binder, a coarse-grained, crosslinkable dispersion copolymer formed from olefinically unsaturated monomers and, if appropriate, further customary lacquer formulation constituents, and the crosslinkable dispersion copolymer being composed of a mixture of at least 2 components which can contain identical or different monomer units, of which at least one component A, which is coarse-grained, has a relatively low average molecular weight, and at least one component B, which can be coarse-grained or fine-grained, has a relatively high average high molecular weight, and the ratio by weight of the components A:B being preferably within the range from 99:1 to 1:1, drying the applied amount of dispersion at a temperature below its minimum film-formation temperature and cross-linking the dried coating by baking at a temperature above the glass transition temperature of the copolymer.

18 Claims, No Drawings

PROCESS FOR BAKE COATING THE SURFACES OF SOLID SUBSTANCES

The invention relates to a process for bake coating the surfaces of solid substances, in particular metals, using aqueous dispersions containing, as the binder, crosslinkable dispersion copolymers formed from olefinically unsaturated monomers.

In recent years, rising prices of raw materials, restrictive regulations for the protection of the environment and also safety requirements have led to numerous developments in the field of baking lacquers having the common aim of finding systems which are not only economical but also environmentally acceptable.

In this respect, the lacquer material must meet the following requirements: (1) Little or no content of organic solvent or substance having a harmful action in the state before processing. (2) Little or no liberation of cleavage products when lacquer systems are baked. (3) The use of substantially non-toxic raw materials in lacquer formulations. (4) Problem-free cleansing and waste disposal in lacquering plants. (5) Problem-free effluent treatment. (6) Cost-saving production and application. (7) Little or no necessity to alter the technical equipment of existing lacquering plants.

Taking these requirements as a basis, the development of new lacquering systems has aligned itself essentially into three directions. The basic idea of the first direction consists in developing conventional lacquers further to give high-solids lacquering systems of high solids content and hence low solvent content. But even in these, during the processes of application, exposure to the atmosphere and baking, solvent is still released and must be removed, for example in subsequent combustion plants. The reduction of solvent content in the high-solids system is, of course, only possible as a result of using special binders. In more highly concentrated solutions, these must have markedly lower viscosities than the conventional lacquer resins. However, film formation can only take place if the development of a three-dimensional network is possible on baking. The binders must therefore be composed of reactive co-reactants.

As already indicated, a factor common to all of these lacquer formulations is that there can be no question of dispensing completely with solvents, and thus the fulfilment of all the requirements mentioned above is, for reasons of principle, not possible.

The second line of development which has evolved from the requirements mentioned above is represented by the so-called powder lacquers. This term is to be undertood as meaning thermoplastics which can be applied in powder form to substrates. Different modes of application technology are distinguished, such as, for example, electrostatic powder spraying, electrostatic fluidization dip coating, pressureless sintering, rotational sintering and others.

The development of powder lacquer technology admittedly signifies a marked improvement in the sense of an ecologically advantageous lacquering system. Disadvantages exist, however, in the form of high capital costs, a complicated change in color shade and high consumption of materials. It should also be borne in mind that the powder form of the lacquer material involves the risk of dust explosions and that the storage and transport of the lacquer products pose problems.

The third line of development is based on the concept of formulating lacquer systems on the basis of aqueous binder systems. In this respect, a distinction must be drawn between systems in which the solid phase dispersed in water is already composed of lacquer particles which are in themselves pigmented and systems in which separate particles of binder and pigment are present alongside one another. The first case is present in the so-called powder-slurries, while the second case describes the situation in baking versions. The development of aqueous powder suspensions or slurry-paints is based on the concept of mixing the environmentally acceptable powder lacquer with water as diluent to give an aqueous lacquer ready for spraying which can be processed on conventional lacquering equipment without the involved processes required for powder lacquering. The preparation of powder-slurries can be effected by various processes, all of which are very expensive and in which it is first necessary to prepare a conventional, solvent-containing lacquer or a powder lacquer which is then converted into an aqueous secondary dispersion.

A substantial simplification in the preparation of aqueous baking lacquer systems consists in employing high-polymer binder dispersions prepared, for example, via emulsion polymerization and pigmenting these like a normal emulsion paint. The difference in principle from the abovementioned secondary dispersions is that in pigmented dispersions of this type the binder and the pigment are separately present alongside one another in the aqueous suspension, whereas the secondary dispersions are aqueous suspensions of lacquer particles which have already been pigmented. A decisive advantage of lacquer systems based on pigmented dispersions, in addition to advantages of application and ecological advantages, is the cost-advantageous manner in which they are prepared. The binder can be prepared in the form of an aqueous dispersion, for example via emulsion and/or suspension polymerization, and can be employed immediately.

The binder dispersions used for this purpose can form a film at temperatures as low as room temperature or can be induced to form a film only by baking processes. However, baking dispersions based on water which form a film even at the drying or exposure temperature used or at lower temperatures can give rise to characteristic lacquer defects, pits as they are called, in the finished coatings.

These pits are formed because, after the aqueous lacquer material has been applied to the surface of the substrate to be coated, film formation at the lacquer surface sets in as soon as the water evaporates. The water still present in the interior of the film cannot escape, because the surface of the film acts as a vapor barrier. The water only evaporates off in the baking process, in the course of which the surface which has already formed a film is torn open again. As a result of the crosslinking which sets in at elevated temperatures, the film area spoilt by the escape of vapor does not seal again. The result is generally a crater-shaped blemish in the lacquer which constitutes a weak point in respect of corrosion resistance and resistance to mechanical stress, to say nothing of the impairment in the decorative effect of the coat of lacquer.

It is possible to avoid a lacquer defect of this type by raising the minimum film-forming temperature of the binder dispersion to values above the temperature of exposure or drying.

A process for coating surfaces in which a pigmented or unpigmented aqueous dispersion of a meltable copolymer having an average particle diameter within the range from 0.5 to 10 μm is applied to the substrate to be coated, is, for example, known from German Offenlegungsschrift No. 2,416,446. The minimum film-forming temperature should be between 10° and 200° C. The coating applied to the substrate should be in the form of a coherent powder after the water has evaporated completely into the atmosphere. Baking is carried out at temperatures at which the particles melt to form a continuous, crack-free film, for example at 177° C. (15 minutes) in the case of acrylic polymers. The thickness of the coating is within the range from 2.5 to 250 μm. However, this coating process has the disadvantage that five process stages are required to prepare the copolymers having the required particle sizes, which, inter alia, is very uneconomical.

In order to obtain surface coatings which are resistant to a very wide variety of effects, it is usual to crosslink the coatings after application. This is effected either via so-called extraneous crosslinking, in which one or more further components carrying reactive groupings are mixed into the formulation, or via self-crosslinking, for which reactive monomers are copolymerized into the binder. In both of the cases distinguished here, the crosslinking can be induced, for example, by heat, light or radiation. Resistance to solvents, as well as resistance to water, is a measure of the strength of surface coatings.

As far as the resistance to solvents and water of baked coatings and the capacity of the latter to resist mechanical stress are concerned, in particular the so-called "Erichsen indentation", it has been found that coatings produced in accordance with German Offenlegungsschrift No. 2,416,446 frequently do not, after baking, have the advantageous properties which are required in this respect. If, for example, in order to achieve a good Erichsen indentation value, binder polymers having relatively high molecular weights are chosen, the melt viscosity of the latter in the baking process is in most cases too high, resulting in a non-uniform leveling of the coating, which can lead to film surfaces having a considerable texture. Adequate resistance to solvents and water cannot be achieved in such a manner either, and the coatings obtained do not have a decorative appearance.

If, on the other hand, the molecular weight of the binder polymers is reduced, although readily leveling film surfaces can be obtained, the resulting baked coatings possess unsatisfactory mechanical properties.

It was therefore required to provide a water-dispersible binder which, on the one hand, can be prepared in a simple manner, compared with the state of the art, and, secondly meets the requirements which have to be set for crosslinkable binders in respect of technical parameters relating to use, such as melt viscosity, film-formation temperature, compatibility with pigments, resistance to solvents or water, elasticity, adhesion, gloss and sharpness of representation.

It has now been found, surprisingly, that the above-mentioned disadvantages can be overcome advantageously if use is made, for the preparation of crosslinkable surface coatings, of a binder based on a coarse-grained dispersion copolymer which carries, at least in part, customary crosslinkable groups and has been formed from olefinically unsaturated monomers and which has an average particle diameter preferably within the range from 0.4 to 10 μm and a minimum film-formation temperature (=MFT) above the temperature of evaporation into the atmosphere or drying, and if the binder dispersion copolymer is composed of a mixture of at least 2 components of which at least one component A, which is coarse-grained, has a relatively low average molecular weight, and at least one further component B, which can be coarse-grained or fine-grained, has a relatively high average molecular weight.

In accordance with the invention, the low average molecular weights are preferably within the range from 5000 to 500,000, in particular 10,000 to 200,000, and the high average molecular weights are preferably in the range from 50,000 to $10 \times 10^6$, in particular 200,000 to $5 \times 10^6$. The determination of molecular weight can be effected by customary methods. Instead of the molecular weight, the parameter of properties taken as a basis can analogously also be, for example, the melt viscosity (mPa.s) of the dispersion copolymer, as is the case in the illustrative embodiments below. In this case increasing viscosity numbers correspond to increasing molecular weights.

The content by weight of the component A preferably at least corresponds to the content by weight of the component B and is, in particular, within the range comprised by A:B=99:1 to 1:1.

The minimum film-formation temperature (MFT) of the crosslinkable binder copolymer dispersion is preferably above 30° C., particular within the temperature range from 35° to 120° C. and is preferably 40° to 80° C.

The baking temperature for the dried coating of dispersion is preferably above the glass transition temperature (Tg) of the dispersion copolymer. In general, it is adjusted to suit the requirements caused by the reactivity of the crosslinkable groups in the copolymer.

The average particle diameter of the binder dispersion copolymer particles in component A is preferably above 0.5 μm, in particular within the range from 0.5 to 5 μm.

The preparation of crosslinkable binder copolymer dispersions according to the invention can be effected advantageously and preferably by mixing, in the desired ratio, coarse-grained or fine-grained dispersions of copolymers carrying customary crosslinkable groups and having a high average molecular weight with coarse-grained dispersions of copolymers carrying customary crosslinkable groups and having a low average molecular weight. Baked coatings which have a very good quality, in particular are not brittle and, for example, can produce Erichsen indentations of over 8 mm can be obtained by means of binder dispersions prepared in this manner.

The prejudice to be understood, inter alia from German Offenlegungsschrift No. 2,416,446, according to which the average molecular weight of the copolymer in cross-linkable binder dispersion copolymers should be kept at low values, preferably within the range between 40,000 and 400,000, in order to enable usable coating results and also good leveling of the lacquer during the baking process to be achieved, can be regarded as refuted in the light of the subject of the invention described above. In addition, it has been found that the use of binder dispersion copolymers having the low molecular weights to be understood from the state of the art generally leads to decidedly brittle baked coatings having Erichsen indentations of only about 1 mm. As against this, crosslinked baked coatings which not only can have very good resistance to water and excellent resistance to solvents, but, in addition, can also have excellent Erichsen indentation values, are obtained when binder dispersion copolymers according to the invention are used.

The invention relates, therefore, to a process for bake coating the surfaces of solid materials by applying the required amount of an aqueous dispersion to the surface to be coated, the dispersion containing, as the binder, a coarse-grained, crosslinkable dispersion copolymer formed from olefinically unsaturated monomers and, if appropriate, containing further constituents belonging to the group comprising pigments, dyestuffs, extenders, water-soluble and/or water-dispersible resins, extraneous crosslinking agents, crosslinking catalysts, thickeners, thixotropic agents, wetting agents, anti-corrosion agents, antifreeze agents, light stabilizers, antioxidants and anti-foaming agents, exposing the moist coating to the atmosphere and/or drying it and subsequently baking, wherein the crosslinkable dispersion copolymer is composed of a mixture of at least 2 components which can contain identical or different monomer units and of which at least one component A, which is coarse-grained, has a relatively low average molecular weight, and at least one component B, which can be coarse-grained or fine-grained, has a relatively high average molecular weight, and the drying of the applied amount of dispersion is carried out at a temperature below the minimum film-formation temperature of the dispersion and the dried coating is then baked at a temperature above the glass transition temperature of the copolymer.

The preparation of binder dispersions according to the invention is preferably effected by emulsion copolymerization, it being possible to use either the process of seed polymerization, which proceeds via at least two stages, or single-stage processes which, if carried out appropriately, can produce the desired particle size figures. In addition, it is also possible to use suspension copolymerization processes. Free radical chain transfer substances, particularly preferably compounds containing mercapto groups, can be used concomitantly in order to achieve low molecular weights.

If the seed polymerization process is used, the number of growth stages or swelling stages should be kept as low as possible for practical reasons. Seed polymerization which can produce a coarse-grained latex in not more than two stages are preferred. The first stage then consists in preparing a seed latex, while, in the second stage the seed latex is swollen to the desired particle diameter, the formation of new particles being avoided as completely as possible. For this purpose it is preferable to start from a substantially monodisperse latex according to the state of the art as a seed base, to which, in a further stage, sufficient monomer is applied to achieve, while maintaining the monodisperse state, an average particle diameter in the final latex greater than 0.5 μm. As is already known (cf. Houben-Weyl, Methoden der Organischen Chemie ("Methods of organic chemistry") volume 14 I, 339 f, (1961)), the metered addition of the emulsifier and/or the concentration of emulsifier in the particular case is of essential importance. Thus, care should, inter alia, be taken that, for example, the surface covering of the particles with ionic emulsifier is preferably less than 100%.

Emulsifiers which can be employed are ionic and nonionic emulsifiers or mixtures thereof. Examples of anionic emulsifiers which are preferably employed are the sodium salts of higher fatty alcohol sulfates, higher alkylsulfonates, or alkylarylsulfonates and the alkali metal and/or ammonium salts of alkyl polyglycol ether-sulfonates or ether-sulfates or alkylaryl polyglycol ether-sulfonates or ether-sulfates.

In the case of nonionic emulsifiers, it is preferable to employ oxethylated fatty alcohols or oxethylated alkylphenols.

In view of the desired particle size, the total amount of emulsifier metered in during the copolymerization should be kept as low as possible. For example, if a certain amount of emulsifier is necessary to increase the stability of the dispersion on storage, this amount can be partly or wholly metered in subsequently.

The olefinically unsaturated, copolymerizable monomers employed for copolymerization must be selected or combined in such a way that the resulting copolymeric binder and the finished coating system have a "minimum film-forming temperature" (MFT) of such a kind that this temperature is still above the temperature of evaporation into the atmosphere or drying. The glass transition temperature of the homopolymers concerned can be used as a reference point for practical selection of monomers in respect of MFT, in order to adjust the film-formation temperature in this way to suitable values.

In order to achieve the desired technical properties in use in the finished lacquer, the copolymeric binder must, in accordance with the invention, contain not only non-functional monomer units but also functional monomer units which enable crosslinking reactions to be carried out. In this respect it is possible to carry out either self-crosslinking of the copolymer molecules or extraneous crosslinking with other components which have been additionally introduced.

The non-functional, olefinically unsaturated monomers employed are preferably esters of acrylic and methacrylic acid in which the alcohol component can contain 1 to 18 carbon atoms. Examples of these are esters containing the radicals methyl, ethyl, methylpropyl, n-butyl, 2-ethylhexyl, heptyl, octyl, propyl, 2-methylbutyl, pentyl, methoxymethyl, ethoxymethyl, ethoxyethyl, isobutyl, cyclohexyl or n-hexyl as the alcohol component.

Furthermore, it is also possible to employ other non-functional monomers, such as, for example, vinyl aromatic compounds, preferably styrene, vinyltoluene and α-methylstyrene. Acrylonitrile and methacrylonitrile can also be employed with advantage.

In order to be able to carry out crosslinking reactions in the lacquer applied when film-formation takes place, monomer units having functional groups must be present in the binder copolymer both in the event of self-crosslinking and in the event of extraneous crosslinking. Monomers having functional groups are to be understood as meaning monomers which, in addition to their olefinic double bond, by means of which they are copolymerized into the resulting copolymer during the preparation of the binder, also contain, in addition, chemical groupings which can be reacted at a later time, preferably after the application of the finished lacquer, with chemical groupings of the same type or of a different type under the influence of energy (heat energy, optical energy or radiation) and/or catalysts, in such a way that a network is formed.

Preferred examples of chemical groupings which can be employed here and can lead to crosslinking in the applied lacquer material, are carboxylic acid, sulfonic acid, hydroxyl, amino, amido, keto, aldehyde, lactam, lactone, isocyanate and epoxy groups. Copolymerizable monomers carrying functional groupings of this type are known.

Comonomer units carrying crosslinkable groups in the dispersion copolymers employed in accordance with the invention are, therefore, preferably those containing functional, crosslinkable radicals belonging to the series of hydroxyl, amido, aldehyde, carboxyl, amino, epoxy, thiol, cyano, N-methylol, isocyanato and/or masked isocyanato groups. Hydroxyl, carboxyl and epoxy groups are particularly preferred.

In a preferred embodiment, the aqueous dispersion according to the invention additionally contains a water-soluble and/or water-dispersible resin or mixtures of resins belonging, in particular, to the series of acrylic resins, melamine-formaldehyde resins and isocyanate resins.

The process according to the invention is preferably used for the production of baking lacquers, hydro-fillers, metallic paints and electropowder coatings (=EPC paints).

Amongst monomers carrying carboxylic acid groupings, it is preferable to employ acrylic acid, methacrylic acid, crotonic acid, itaconic acid, fumaric acid, maleic acid, maleic acid half-ester or the half-esters of itaconic acid and of fumaric acid. Acrylic acid and methacrylic acid are particularly preferred.

Amongst monomers carrying epoxide groupings suitable for cross-linking, it is preferable to employ glycidyl methacrylate, glycidyl acrylate and allyl glycidyl ether.

Further copolymerizable monomers which carry functional groups and can be utilized for crosslinking reactions of binders according to the invention, are monomers containing isocyanate groups, for example preferably isocyanatoethyl methacrylate, and derivatives thereof containing a masked isocyanate group, and also aminoalkyl compounds, preferably, for example, methylaminoethyl methacrylate and tert.-butylaminoethyl methacrylate, amides, preferably, for example, methacrylamide, N-alkoxyalkylamides, preferably, for example, methoxymethylmethacrylamide or ethoxymethylmethacrylamide, or hydroxyalkylamides, preferably, for example, N-methylolmethacrylamide and hydroxyalkyl esters, preferably, for example, hydroxyethyl methacrylate and hydroxypropyl methacrylate; and also the analogs of the abovementioned methacrylic acid derivatives derived from other unsaturated acids, preferably derived from acrylic acid, itaconic acid or crotonic acid.

As monomer units, relative to the dispersion copolymer, preferred binder dispersion copolymers can contain, for example, 0 to 85% by weight of methyl methacrylate, 60 to 0% by weight of butyl acrylate, 0 to 20% by weight of hydroxyethyl methacrylate, 20 to 0% by weight of glycidyl methacrylate and 0 to 20% by weight of acrylic acid or methacrylic acid. Binder dispersions which are particularly preferred can contain, relative to the dispersion copolymer, for example, 50 to 85% by weight of methyl methacrylate, 15 to 50% by weight of butyl acrylate, 0 to 15% by weight of hydroxyethyl methacrylate, 15 to 0% by weight of glycidyl methacrylate and 2 to 10% by weight of acrylic acid or methacrylic acid as monomer units.

In addition to self-crosslinking, so-called extraneous crosslinking is also possible. This is effected by mixing a finished binder copolymer dispersion containing one or more of the types of functional monomer units described above with another low-molecular, oligomeric or polymeric compound which also carries functional groups of the type mentioned above.

The crosslinking of the binder is also effected in the course of the extraneous crosslinking, preferably in the course of baking, preferentially by means of a reaction between the functionalized binder copolymer and the extraneous added component. In this respect it is not always possible to exclude the possibility that two components will also be capable of undergoing reaction/crosslinking with themselves.

Preferred examples of crosslinking extraneous components are melamine-formaldehyde resins, acrylic resins and masked isocyanate resins, i.e. isocyanate resins having a blocked isocyanate group, which, in the course of baking, can produce highly crosslinked coatings with or without the action of catalysts, such as, preferably, maleic, citrous or phosphoric acid, an alkylphosphoric acid, p-toluenesulfonic acid and/or naphthalenedisulfonic acid, and in the presence of binder copolymers which preferably carry hydroxyl, amide or carboxyl groups or other functional groupings such as those described above.

It is very particularly preferable to employ acrylic resins and/or methyl-etherified melamine resins (for example (R)Maprenal MF 900) as extraneous crosslinking components. For example, in a preferred embodiment of the coating produced by extraneous crosslinking, 20 parts by weight of a dispersion according to the invention are mixed with 3.4 parts by weight of Maprenal MF 900, and, after drying, the coating is baked for 30 minutes at 180° C.

A selective adjustment of molecular weights or the achievement of low molecular weight can be effected by adding free radical chain transfer substances in the preparation of the preparation of the dispersion copolymers by emulsion or suspension copolymerization. Free radical chain transfer substances which are preferred in this respect are such known compounds, used in such amounts, as are frequently employed, for example in emulsion polymerization, for the purpose of regulating the molecular weight, for example mercaptans, in which respect n-dodecyl mercaptan, tert.-dodecyl mercaptan, thioglycolic acid and thioglycolic acid esters are used preferentially, or halogenated compounds, such as, for example, carbon tetrachloride, bromotrichloromethane and chlorobenzene, and other compounds which are active transfer agents, preferably toluene and α-methylstyrene. Polyfunctional free radical chain transfer agents containing HS groups, especially, for example, the thioglycolic acid esters of ethylene glycol, 1,2-propylene glycol, 1,3-propylene glycol, 1,2-butylene glycol, 1,3-butylene glycol, 1,4-butylene glycol, glycerol, trimethylolpropane, pentaerythritol and di-, tri- or tetraethylene glycol are particularly preferred. Tetrakismercaptoacetylpentaerythritol is very particularly preferred.

A preferred form of the binder copolymer dispersions employed in accordance with the invention consists in effecting the mixing of at least two different dispersions. For example, a latex B having a high molecular weight (for example $M_w=200,000$ to $5\times10^6$ or higher), prepared without the use of a molecular weight regulator and a coarse-grained latex A of low molecular weight (for example $M_w=20,000$ to 200,000), prepared using a molecular weight regulator, are preferably mixed with one another in such a way that the minimum film-formation temperature of the mixture is above the temperature of evaporation into the atmosphere or drying of the coatings. The binder dispersions employed in this case can have identical monomer compositions, but can also have different monomer compositions. The monomers suitable in this case have already been described above in detail, both for the case of self-crosslinking and for the case of extraneous crosslinking.

The mechanical properties of lacquer systems can be improved decisively by means of the mixtures according to the invention. On the one hand, a reduction of the melt viscosity of the coating mass to be crosslinked (for example to 300–100,000 mPa.s, preferably 500–50,000 mPa.s) can be achieved when baking, thereby producing good leveling of the film, for example by means of low-molecular, hard dispersion copolymer constituents, whereas, on the other hand, the high molecular weights of the second component result in good mechanical properties, in particular a good Erichsen indentation, in the finished, baked film. Thus, for example, a baked coating prepared from only one single low-molecular component of controlled molecular weight generally has an Erichsen indentation of only about 1–2 mm, whereas baked coats of lacquer which have an Erichsen indentation of, for example, 8 mm or higher result, in accordance with the invention, after mixing with a component of high average molecular weight, prepared without the use of a molecular weight regulator. In this respect, the mixing of the components should be carried out in such a ratio by weight that the other advantageous properties of baked coatings, such as, for example, gloss, hardness, resistance to water, resistance to solvents or adhesion, remain unimpaired.

In a further preferred embodiment, a water-soluble substance which preferably improves the rheological properties of the aqueous system is also added to the coarse-grained binder copolymer dispersions described above. In particular, a property which is frequently desired in this case is that of thickening, such as is achieved, for example, preferably by adding water-soluble polymers, such as modified celluloses, for example cellulose ethers, and/or poly(meth)acrylate thickeners, polyacrylamides, polyvinylpyrrolidone and other compounds. In preferred embodiments it can also be advantageous, however, to exercise other influences on the rheological properties of the aqueous copolymer dispersions and of the pigmented lacquer mixtures produced from them. For example, a thixotropic influence is frequently of interest, in order to counteract a possible tendency of dispersed particles in the aqueous system to settle out, and, if appropriate, to avoid at the same time the tendency of already applied lacquers to run off more or less vertical surfaces. In this case it is preferable to employ thixotropic agents which are effective in aqueous systems, such as, for example, titanates and/or colloidal grades of $SiO_2$ (for example Aerosil). In certain cases it can be advantageous to combine with one another the use of the water-soluble and rheologically effective polymers mentioned above and the use of agents which have a thixotropic effect, and to make use of any synergistic effects of the two components which may result in a given case.

The invention is illustrated in greater detail by means of the examples below.

COMPARISON EXAMPLE 1

Preparation of a binder dispersion (a dispersion copolymer without functional monomer units, as a comparison)

(A) Seed base (1 VA)

The dispersion employed as the seed base is prepared by the following process:

7.5 parts by weight of a monomer emulsion composed of 438 parts by weight of $H_2O$, 31.5 parts by weight of isooctylphenol polyglycol ether (10 EO units), 15.7 parts by weight of sodium laurylsulfate, 31.5 parts by weight of trichlorobromomethane, 787.5 parts by weight of methyl methacrylate and 787.5 parts by weight of butyl acrylate are added at 80° C. to an initial amount of 750 parts by weight of water. The polymerization is initiated by adding 10 parts by weight of a solution of 2 parts by weight of ammonium persulfate in 100 parts by weight of $H_2O$, also at 80° C. The remainder of the initiator solution is metered in together with the remaining monomer emulsion in the course of 4 hours. Completion of the reaction is effected in the course of 1 hour, also at 80° C. Solids content of the resulting dispersion: 55.1% by weight; average particle size: 0.22 μm.

(B) Seed polymerization, trial 1 VB/1

100 parts by weight of a mixture of 480 parts by weight of methyl methacrylate, 120 parts by weight of butyl acrylate and 6 parts by weight of tetrakismercaptoacetylpentaerythritol (free radical chain transfer agent) are added to a mixture of 18.2 parts by weight of seed base 1 VA and 714 parts by weight of water, and polymerization is initiated at 80° C. by means of 10 parts by weight of a solution of 1.5 parts by weight of ammonium persulfate in 100 parts by weight of water.

After 30 minutes preliminary polymerization, the metering in of the remaining amount of monomers is begun (total metering time: 7.5 hours). When half the amount of monomers has been added, metering in of a solution of 0.6 parts by weight of sodium laurylsulfate in 100 parts by weight of water is begun. This solution is metered in at such a rate that half of this solution has been added when the metering in of the monomers has been completed, and the remainder is added all at once. Solids content of the resulting dispersion: 39.5% by weight; average particle size: 0.70 μm. (C) Using seed base 1 VA,: the further polymerization trials 1 VB/2, 1 VB/3 and 1 VB/4 are carried out by the procedure described under B, trial 1 VB/1, with the modification that the proportion of free radical chain transfer nagent (FRCTA) is varied in the manner indicated in Table 1. The amount of FRCTA and the properties of the resulting dispersion are shown in summary form in Table 1. The technical properties of the dispersions in use are summarized in Table 2.

TABLE 1

Seed polymerization carried out by procedure
1 VB/1 using increasing amounts of FRCTA
(tetrakismercaptoacetylpentaerythritol)

| | Emulsion copolymerization | | Dispersion | | Copolymer | |
|---|---|---|---|---|---|---|
| Trial No. | Seed latex | Parts by weight of FRCTA | Particle size ($\mu$m) | Solids content (% by weight) | Melt viscosity, mPa.s at 180° C. | Glass transition temperature (°C.)* |
| 1 VB/1 | 1 VA | 6 | 0.70 | 39.5 | 650,000 | 65.5 |
| 1 VB/2 | 1 VA | 12 | 0.75 | 39.5 | 138,000 | 60 |
| 1 VB/3 | 1 VA | 18 | 0.74 | 39.0 | 40,000 | 56 |
| 1 VB/4 | 1 VA | 30 | 0.74 | 38.2 | 1,500 | 49.5 |

*Determined by differential thermoanalysis

TABLE 2

Technical properties in use of pigmented and
unpigmented baking lacquers based on dispersions
from trials 1 VB/1 to 1 VB/4

| | Coating[1] with unpigmented[3] dispersion | | | Coating[1] with pigmented[4] dispersion | | |
|---|---|---|---|---|---|---|
| Dispersion from trial No. | powder coating after the dispersion has been exposed | after baking[2] at 150° C. for 30 minutes | thickness of coating ($\mu$m) | powder coating after the dispersion has been exposed | after baking[2] at 150° C. for 30 minutes | thickness of coating ($\mu$m) |
| 1 VB/1 | ++ | cracking | 50 | ++ | cracking | 27 |
| 1 VB/2 | ++ | + | 30 | ++ | + | 35 |
| 1 VB/3 | ++ | + | 30 | ++ | + | 30 |
| 1 VB/4 | ++ | + | 30 | ++ | + | 22 |

[1] Phosphated iron sheets (bonder 132) are coated.
[2] All the baked coatings have a resistance of less than 1 minute to xylene at 20° C.
++ = crack-free powder layer
+ = crack-free film

[3] Unpigmented dispersion: solids content approx. 39% by weight, pH = 2.5

Composition: 100.0 parts by weight of dispersion (solids content 40% by weight)
4.5 parts by weight of wetting agent mixture$^x$ 104.5 parts by weight

[4] Pigmented dispersions: pigment/binder ratio = 0.2:1, pH = 8.9

Composition: 100.0 parts by weight of dispersion (solids content 40% by weight)
4.5 parts by weight of wetting agent mixture$^x$
30.0 parts by weight of TiO$_2$ paste $^{xx}$ 134.5 parts by weight $^x$ wetting agent mixture:
10 parts by weight of Orotan 731 SD$^a$ 25% by weight solution in H$_2$O
20 parts by weight of Triton CF 10$^b$
15 parts by weight of sodium nitrite, 10% by weight solution in H$_2$O 45 parts by weight $^{xx}$ TiO$_2$ paste:
320.0 parts by weight of TiO$_2$ Cl 310 (rutile grade, Kronos Cl 310)
4.8 parts by weight of Triton CF 10$^b$
3.2 parts by weight of Orotan 731 SD$^a$, 25% by weight solution in H$_2$O
10.2 parts by weight of Viscalex HV 30 (polyacrylate thickener)
450.0 parts by weight of H$_2$O 788.2 parts by weight $^a$ Orotan 731 SD = Na salt of a copolymer formed from diisobutene and maleic anhydride
$^b$ Triton CF 10 = isooctylphenolpolyglycol benzyl ether

COMPARISON EXAMPLE 2

Seed polymerizations are carried out analogously to comparison Example 1 (B), trial 1 VB/1, starting with the seed base 1 VA from comparison Example 1 (A), and varying the preparation procedure as indicated in Table 3. The mixture of monomers used in each case is a total of 60 parts by weight in which the comonomers methyl methacrylate (MMA) and butylacrylate (Bua) are present in a ratio by weight of 4:1 and in which the comonomers methacrylic acid (MAA) and glycidyl methacrylate (glyma), which carry functional and crosslinkable groups and also FRCTA (tetrakismercaptoacetylpentaerythritol) are additionally present in the proportions by weight indicated in Table 3. Table 3 also shows the solids content of the dispersions resulting from trials 2 VB/1 to 2 VB/8. The average particle diameter (D) of the dispersion copolymer particles is approx. 0.8–0.9 μm.

enamel dispersions, dried at room temperature and then baked at 180° C. for 30 minutes. The resulting film thickness of the white enamels is approx. 30 μm. The gloss values (in %) are measured at 20° and 60° and in virtually all the trials are 80±3% and 92±2%. The Erichsen indentation is determined in a known manner and is quoted in mm. As the results show, the Erichsen indentation in all the trials has a very unsatisfactorily low value of about 1 mm. As a comparison, the dispersion from trial No. 1 VB/4 from Table 1 is also tested.

The white enamels are prepared in accordance with the recipe indicated immediately after Table 4.

TABLE 4

The technical properties in use of baked white enamels[1] based on dispersions from trials 2 VB/1 to 2 VB/8. Measurement of gloss and Erichsen indentation.

| | Dispersion No. | | | | | | | | |
|---|---|---|---|---|---|---|---|---|---|
| | 1 VB/4 | 2 VB/1 | 2 VB/2 | 2 VB/3 | 2 VB/4 | 2 VB/5 | 2 VB/6 | 2 VB/7 | 2 VB/8 |
| Gloss, 20°/60° (in %) | 83/92 | 82/91 | 78/88 | 82/91 | 80/90 | 81/92 | 82/91 | 81/91 | 80/92 |
| Erichsen indentation (in mm) | 1.0 | 1.0 | 1.1 | 1.2 | 1.2 | 1.0 | 1.0 | 1.1 | 1.4 |

[1]Recipe for the formulation of the white enamels:
  100.0 parts by weight of dispersion (solids content 40% by weight)
  2.50 parts by weight of wetting agent mixture+
  20.00 parts by weight of $TiO_2$ paste++
  10.00 parts by weight of water
  132.50 parts by weight
All the constituents of the recipe are added to the dispersion with stirring.
+Wetting agent mixture:
  10.00 parts by weight of Orotan 731 SD (25% by weight solution in $H_2O$)
  20.00 parts by weight of Triton CF 10
  15.00 parts by weight of sodium nitrite (10% by weight solution in $H_2O$)
  45.00 parts by weight
++$TiO_2$ paste:
  400.00 parts by weight of $TiO_2$ (rutile grade, Kronos RN 59)
  9.60 parts by weight of Triton CF 10
  6.40 parts by weight of Oroton 731 SD (25% by weight solution in $H_2O$)
  384.00 parts by weight of $H_2O$
  800.00 parts by weight

TABLE 3

Seed polymerization in accordance with procedure 1 VB/1 while varying the content of comonomer units (glyma and MAA) carrying functional, crosslinkable groups and varying the amounts of FRCTA added (tetrakismercaptoacetylpentaerythritol).

| | Starting mixture | | Mixture of monomers | | | | | Solids content |
|---|---|---|---|---|---|---|---|---|
| Trial No. | Seed base 1 VA (parts by weight) | $H_2O$ (parts by weight) | MMA (parts by weight) | Bua (parts by weight) | Glyma (parts by weight) | FRCTA (parts by weight) | MAA (parts by weight) | of the dispersion (% by weight) |
| 2 VB/1 | 18.16 | 769.8 | 480 | 120 | 30 | 18 | — | 39.9 |
| 2 VB/2 | 18.16 | 813.0 | 480 | 120 | 60 | 16 | — | 40.1 |
| 2 VB/3 | 18.16 | 787.4 | 480 | 120 | 30 | 30 | — | 39.7 |
| 2 VB/4 | 18.16 | 817.4 | 430 | 120 | 60 | 30 | — | 40.0 |
| 2 VB/5 | 18.16 | 743.3 | 480 | 120 | 30 | 18 | 6 | 40.1 |
| 2 VB/6 | 18.10 | 752.1 | 480 | 120 | 30 | 18 | 12 | 40.6 |
| 2 VB/7 | 18.16 | 781.5 | 480 | 120 | 30 | 30 | 6 | 38.6 |
| 2 VB/8 | 18.16 | 790.3 | 480 | 120 | 30 | 30 | 12 | 39.7 |

The results of testing the technical properties in use of the dispersions described in Table 3, Nos. 2 VB/1 to 2 VB/8, in white enamels are shown in summary form in Table 4. For this purpose phosphated iron sheets (bonder 132) are coated with the appropriate white

EXAMPLE 1

Seed polymerizations are carried out analogously to the preparation procedure in comparison Example 1, using the seed base 1 VA from comparison Example 1 A and monomer components in accordance with comparison Example 2, but by carrying out a preliminary polymerization. Trials 1B/1 and 1B/2 are carried out with the components and proportions indicated in Table 5. Table 5 also indicates the solids content of the resulting dispersions (in % by weight). Trial 1B/1 is carried out with the addition of an FRCTA (tetrakismercaptoacetylpentaerythritol) in order to reduce the molecular weight, whereas trial 1B/2 is carried out without addition of FRCTA. Details can be seen in Table 5.

TABLE 5

Seed polymerization with and without the addition of FRCTA (tetrakismercaptoacetylpentaerythritol).

| | Starting mixture | | Mixture of monomers | | | | | Solids content of the dispersion (% by weight) |
|---|---|---|---|---|---|---|---|---|
| Trial No. | Seed base 1 VA (parts by weight) | H₂O (parts by weight) | Mixture of monomers (parts by weight) | MMA (parts by weight) | Bua (parts by weight) | Glyma (parts by weight) | MAA (parts by weight) | FRCTA (parts by weight) | |
| 1B/1 | 10.83 | 794.3 | 50 | 480 | 120 | 30 | 24 | 18 | 40.2 |
| 1B/2 | 10.83 | 767 | 50 | 420 | 180 | 30 | 24 | — | 37.7 |

Table 6 shows the gloss values and also the Erichsen indentation of baked clear lacquers prepared from the individual dispersions of trials Nos. 1B/1 and 1B/2 and from a mixture of dispersions 1B/1 and 1B/2 in a 3:1 ratio by weight, in each case following the clear lacquer recipe[1] listed below Table 6. For this purpose, phosphated iron sheets (bonder 132) are coated with the particular aqueous clear lacquer dispersion, dried at room temperature and then baked at 180° C. for 30 minutes. The resulting film thickness of the baked clear lacquers is approx. 30 μm. The gloss values (in %) and the Erichsen indentation (in mm) are determined analogously to comparison Example 2. As the results in Table 6 show, good gloss values and a poor Erichsen indentation result using dispersion 1B/1, and poor gloss values and a good Erichsen indentation result using dispersion 1B/2, whereas both good gloss values and a good Erichsen indentation result using the mixture of dispersions according to the invention composed of 3 parts by weight of 1B/1 and 1 part by weight of 1B/2.

TABLE 6

The technical properties in use of baked clear lacquers[1] based on dispersions from trials 1B/1 and 1B/2 and from a mixture of these dispersions in a 3:1 ratio by weight; measurement of gloss and Erichsen indentation.

| Dispersion from trial No. | Baked clear lacquer from: | | |
|---|---|---|---|
| | 1B/1 | 1B/2 | 3:1 (parts by weight) mixture of 1B/1:1B/2 |
| Gloss, 20°/60° (in %) | 80/92 | 12/34 | 72/86 |
| Erichsen indentation (in mm) | 1.4 | >8 | >8 |

[1]Recipe for the formulation of the clear lacquers:
   100 parts by weight of dispersion (solids content 40% by weight)
     2 parts by weight of wetting agent mixture+
   102 parts by weight
+Wetting agent mixture:
   10 parts by weight of Orotan 731 SD (25% by weight solution in H₂O)
   20 parts by weight of Triton CF 10
   15 parts by weight of sodium nitrite (10% by weight solution in H₂O)

The wetting agent mixture is added to the dispersions with stirring.

EXAMPLE 2

Seed polymerizations were carried out analogously to Example 1 with the components and amounts of components listed in Table 7 for trials 2B/1 and 2B/2. 9 parts by weight of ammonium persulfate in 600 parts by weight of H₂O were used as initiator and 3.6 parts by weight of sodium laurylsulfate in 600 parts by weight of H₂O are used as the emulsifier. Table 7 also shows the solids content of the resulting dispersions (in % by weight). Test 2B/2 is carried out with the addition of a small amount of FRCTA (tetrakismercaptoacetylpentaerythritol) and trial 2B/1 using 10 times the amount of FRCTA compared with trial 2B/2, so that a lower average molecular weight of the resulting dispersion copolymer can be expected in trial 2B/1 than in trial 2B/2.

TABLE 7

Seed polymerization using varying added amounts of FRCTA (tetrakismercaptoacetylpentaerythritol).

| | Starting mixture | | Mixture of monomers | | | | | Solids content of the dispersion (% by weight) |
|---|---|---|---|---|---|---|---|---|
| Trial No. | Seed base 1 VA (parts by weight) | H₂O (parts by weight) | Mixture of monomers (parts by weight) | MMA (parts by weight) | Bua (parts by weight) | Glyma (parts by weight) | MAA (parts by weight) | FRCTA (parts by weight) | |
| 2B/1 | 65 | 4495 | 300 | 2880 | 720 | 180 | 144 | 108 | 41.4 |
| 2B/2 | 65 | 4626 | 300 | 2700 | 900 | 180 | 144 | 18 | 40.0 |

Table 8 shows the gloss values and the Erichsen indentation of baked clear lacquers prepared from the various dispersions of trials 2B/1 and 2B/2 and from a mixture of dispersions 2B/1 and 2B/2 in a 3:1 ratio by weight. The preparation of the clear lacquers and the baking thereof is carried out as described in Example 1, as is the determination of the gloss values and the Erichsen indentation. As the results in Table 8 show, the mixture, according to the invention, of dispersions composed of 2B/1 and 2B/2 in a 3:1 ratio by weight leads to excellent and surprising properties in the baked clear lacquer.

TABLE 8

The technical properties in use of baked clear lacquers based on dispersions from trials 2B/1 and 2B/2 and from a mixture of these dispersions in a 3:1 ratio by weight; measurement of gloss and Erichsen indentation.

| Dispersion from trial No. | Baked clear lacquer from: | | |
|---|---|---|---|
| | 2B/1 | 2B/2 | 3:1 (parts by weight) mixture of 2B/1:2B/2 |
| Gloss, 20°/60° (in %) | 78/94 | 15/36 | 78/94 |
| Erichsen indentation (in mm) | 1.1 | 8 | 8 |

We claim:

1. A process for bake coating the surfaces of solid materials by applying an amount of an aqueous dispersion to the surface to be coated, the dispersion containing, as binder, a coarse-grained, crosslinkable dispersion copolymer formed from olefinically unsaturated monomers, containing further constituents belonging to the group comprising pigments, dyestuffs, extenders, water-soluble and/or water-dispersible resins, extraneous crosslinking agents, crosslinking catalysts, thickeners, thixotropic agents, wetting agents, anti-corrosion agents, antifreeze agents, light stabilizers, antioxidants and, exposing the resulting moist coating to the atmosphere and/or drying it and subsequently baking, wherein the crosslinkable dispersion copolymer is composed of a mixture of at least 2 components which can contain identical or different monomer units and of which at least one component A, which is coarse-grained, has a relatively low average molecular weight, and at least one component B, which is coarse-grained or fine-grained, has a relatively high average molecular weight, and the drying of the applied amount of dispersion is carried out at a temperature below the minimum film-formation temperature of the dispersion and the dried coating is then baked at a temperature above the glass transition temperature of the copolymer.

2. A process as claimed in claim 1, wherein the ratio by weight of the components A:B is within the range of from 99:1 to 1:1.

3. A process as claimed in claim 1, wherein the component A has been prepared using a molecular weight regulator and the component B has been prepared without the use of a molecular weight regulator.

4. A process as claimed in claim 1, wherein the average particle diameter of the crosslinkable binder dispersion copolymer of component A is within the range of from 0.5 to 5 μm.

5. A process as claimed in claim 1, wherein the minimum film-formation temperature of the dispersion is within the range from 30° to 120° C.

6. A process as claimed in claim 1, wherein the aqueous dispersion contains a water-soluble and/or water-dispersible resin selected from the group consisting of acrylic resin, melamineformaldehyde resin and isocyanate resin.

7. A process as claimed in claim 1, wherein the dispersion copolymer contains crosslinkable groups, each of which is a functional radical selected from the group consisting of hydroxyl, amido, aldehyde, carboxyl, amino, epoxy, thiol, cyano, N-methylol, isocyanato and masked isocyanato.

8. A process as claimed in claim 1, wherein the dispersion copolymer contains crosslinkable groups, each of which is a functional radical selected from the group consisting of hydroxyl, carboxyl and epoxy.

9. A process as claimed in claim 1, wherein the component A has been prepared by emulsion or suspension copolymerization with the addition of a mercapto-group-containing free radical chain transfer substance.

10. A process as claimed in claim 1, wherein the component A has been prepared by emulsion or suspension copolymerization with the addition of tetrakismercaptoacetylpentaerythritol as a free radical chain transfer agent.

11. A process for bake coating a surface of a solid material by coating the surface with an aqueous dispersion, exposing the resulting moist coating to the atmosphere and/or drying it, and subsequently baking the dried coating,
the aqueous dispersion comprising (a) binder, which is a coarse-grained, crosslinkable dispersion copolymer formed from olefinically-unsaturated monomers and optionally further comprising (b) a constituent selected from the group consisting of pigment, dyestuff, extender, water-soluble and/or water dispersible resin, extraneous crosslinking agent, crosslinking catalyst, thickener, thixotropic agent, wetting agent, anti-corrosion agent, antifreeze agent, light stabilizer, antioxidant and antifoaming agent,
the crosslinkable dispersion copolymer being composed of a mixture of at least two components, A and B, which contain identical or different monomer units; component A being coarse-grained and having a relatively low average molecular weight, and component B being coarse-grained or fine-grained and having a relatively high average molecular weight,
the drying being effected at a temperature below the minimum film-formation temperature of the dispersion, and the baking being effected at a temperature above the glasstransition temperature of the copolymer.

12. A process as claimed in claim 11 wherein the dispersion copolymer is formed from emulsion polymerization of olefinically-unsaturated monomers.

13. A process as claimed in claim 11 wherein the dispersion copolymer is formed from suspension polymerization of olefinically-unsaturated monomers.

14. A process as claimed in claim 1 wherein said dispersion contains at least one further constituent selected from the group consisting of pigment, dyestuff, extender, water-soluble and/or water dispersible resin, extraneous cross-linking agent, crosslinking catalyst, thickener, thixotropic agent, wetting agent, anti-corrosion agent, antifreeze agent, light stabilizer, antioxidant and anti-forming agent.

15. A process as claimed in claim 1 wherein the sole essential constituents of the aqueous dispersion are water, component A and component B.

16. A process as claimed in claim 6 wherein the water-soluble and/or water dispersible resin is acrylic resin.

17. A process as claimed in claim 6 wherein the water-soluble and/or water dispersible resin is melamineformaldehyde resin.

18. A process as claimed in claim 6 wherein the water-soluble and/or water dispersible resin is isocyanate resin.

* * * * *

UNITED STATES PATENT AND TRADEMARK OFFICE
CERTIFICATE OF CORRECTION

PATENT NO. : 4,610,898
DATED : September 9, 1986
INVENTOR(S) : ENGEL et al

It is certified that error appears in the above-identified patent and that said Letters Patent are hereby corrected as shown below:

Column 17, line 17, "an amount" should read --an effective amount--;

lines 21 to 27, "mers, containing...antioxidants and" should read --mers--.

line 54, "range" should read --range of--.

Column 18, line 54, "anti-forming" should read --anti-foaming--.

Signed and Sealed this

Sixth Day of January, 1987

Attest:

DONALD J. QUIGG

Attesting Officer

Commissioner of Patents and Trademarks